United States Patent [19]

Lee

[11] 4,336,273

[45] Jun. 22, 1982

[54] VEGETABLE AND FRUIT PRESERVATION PROCESS

[75] Inventor: Chi-Hang Lee, Walnut Creek, Calif.

[73] Assignee: Del Monte Corporation, San Francisco, Calif.

[21] Appl. No.: 193,778

[22] Filed: Oct. 3, 1980

[51] Int. Cl.³ .............................. A23B 7/14; A23L 3/34
[52] U.S. Cl. .................................... 426/321; 426/331;
426/325; 426/615; 426/654
[58] Field of Search .............. 426/331, 131, 325, 615,
426/629, 634, 407, 324, 654

[56] References Cited

U.S. PATENT DOCUMENTS

| | | | |
|---|---|---|---|
| 1,021,770 | 4/1912 | Glacken | 426/324 |
| 1,956,770 | 5/1934 | McCrosson | 99/8 |
| 2,860,055 | 11/1958 | Jansen | 99/154 |
| 2,890,120 | 6/1959 | Makower | 99/154 |
| 2,934,439 | 4/1960 | Michener et al. | 99/150 |
| 3,062,659 | 11/1962 | Hyson et al. | 99/103 |
| 3,183,102 | 5/1965 | Malecki | 99/186 |
| 3,238,094 | 3/1966 | Heininger et al. | 426/331 |
| 3,245,807 | 4/1966 | Colby | 99/186 |
| 3,443,972 | 5/1969 | DiMarco et al. | 99/182 |
| 3,537,867 | 11/1970 | Glasser et al. | 99/186 |
| 3,652,300 | 3/1972 | Sharma | 426/615 |
| 3,758,257 | 9/1973 | Dastur | 426/331 |
| 4,140,802 | 1/1979 | Kelly et al. | 426/331 |

OTHER PUBLICATIONS

Ahmad, Maqbool and Amin M. Hussain, "Problem of Texture Deterioration During Canning and Storage of Canned Fruits and Vegetables", *Pakistan Journal of Science*, vol. 24, Nos. 1 and 2 (1972), 33-40.

*Primary Examiner*—Raymond N. Jones
*Assistant Examiner*—Elizabeth J. Curtin
*Attorney, Agent, or Firm*—Herbert J. Bluhm

[57] ABSTRACT

Loss of texture in vegetable and fruit material caused by heating such material in connection with the preservation thereof can be minimized by contacting the fresh vegetable and fruit material with certain organic compounds for a short period of time and then removing the organic compound by rinsing the material with water or a water-based medium prior to heating the vegetable and fruit material.

39 Claims, No Drawings

VEGETABLE AND FRUIT PRESERVATION PROCESS

TECHNICAL FIELD

This invention relates to a process for treating vegetables and fruits in connection with the preservation thereof. The presently disclosed process minimizes deterioration of the texture and shape of the vegetables and fruits which otherwise results from processing conditions prevailing during their preservation.

BACKGROUND ART

Perhaps the most widely used method for preserving vegetables and fruits is canning. Although the canned products have good storage characteristics, most canned vegetables and fruits undergo a certain amount of deterioration due primarily to the conventional heat processing used to sterilize the contents of the can. This deterioration generally involves softening of the vegetable or fruit material and a marked change in its texture and appearance as compared with the corresponding product in the fresh state. The differences between the fresh and canned products are readily perceived by the consumer and they play an important role in determining consumer preference for a particular product. Accordingly, considerable effort has been devoted over the years to the development of processing techniques which minimize the deterioration that normally accompanies the canning of vegetables and fruits.

Among the techniques investigated for reducing texture deterioration in canned vegetables and fruits are adjustment of pH, time/temperature adjustments of blanching steps used in the canning process, addition of calcium salts and the addition of chemical agents which inhibit microbial growth and permit the use of less severe heating conditions for the canned material. Combinations of these techniques have also been employed but the most widely used method for retaining texture in canned vegetables or fruits appears to be the addition of calcium salts such as calcium chloride, calcium lactate, calcium citrate, calcium malate and calcium phosphate. While treatment with calcium salts is effective to some extent in providing improved texture, such treatment may adversely affect the taste of the treated and canned product. Thus, prior art methods do not provide a totally satisfactory canned product.

DISCLOSURE OF INVENTION

The present invention is based on the discovery that the texture and shape of fresh fruits and vegetables which are preserved by canning can be stabilized to a considerable degree by treating the fruits and vegetables with certain organic compounds prior to heat processing the canned product.

In a preferred embodiment of the invention, fresh fruits or vegetables are processed in the usual way for canning purposes but the processing steps include treatment with particular organic compounds. This treatment involves contacting for a short period of time the prepared fresh fruit or vegetable with an effective amount of the organic compound. The organic compound is then removed by draining or other suitable means and the treated fruit or vegetable is rinsed with water or a water-based medium containing additional solvents such as ethanol and propylene glycol to remove residual amounts of the organic compound. The treated and rinsed fruit or vegetable material is then canned and/or heat processed in the conventional manner at temperature of at least 80° C. and, preferably, at temperatures in excess of 95° C. to effect sterilization of the material. The term "sterilization" and related terms as used herein are not intended to denote an absolute degree of sterility. Rather, the terms are used in the sense of rendering the heat processed material free of viable forms of microorganisms having public health significance as well as microorganisms of non-health significance which are capable of reproducing in the processed material under normal conditions of storage and distribution.

A number of organic compounds are effective for the purpose of this invention. The compounds need not be soluble in water although it is preferred that they exhibit at least limited solubility in water or aqueous media containing additional solvents or additives to facilitate removal of residues by rinsing subseqent to treatment. Water solubility is also a desirable property for those organic compounds which are normally solid at ambient temperatures in which case an aqueous medium containing the organic compound is employed for treating the fruit or vegetable. Even when the compound is normally liquid at ambient temperatures, it is convenient to use an aqueous medium containing the organic compound for treating the fruit or vegetable. For compounds which are sparingly soluble in water it is desirable to add small amounts of a surface-active agent such as the non-ionic polyoxyalkylene derivatives of sorbitan monolaurate, sorbitan monopalmitate, sorbitan monostearate or sorbitan monooleate to improve dispersion of the compound in the aqueous medium.

Among the organic compounds which provide a beneficial effect in the practice of this invention are aldehydes such as formaldehyde, acetaldehyde, propionaldehyde, hexanal, octanal, 2,6-dimethyl-5-heptenal and 2-hexenal; alcohols such as methanol, ethanol, 1-propanol, 2-propanol, 1-butanol, isoamyl alcohol, 1-hexanol, 1-octanol, 2-hexenol, phenethyl alcohol, cinnamyl alcohol and benzyl alcohol; amides such as acetamide, succinimide and benzamide; esters such as allyl acetate, allyl cinnamate, diethyl succinate, methyl acetate, ethyl acetate, propyl acetate, hexyl acetate, benzyl butyrate, benzyl acetate, benzyl cinnamate, 1-bornyl acetate, cyclohexyl propionate, propylene carbonate, methyl formate, ethyl acrylate, methyl methacrylate, ethyl acetoacetate, isoamyl isovalerate, amyl octanoate, ethyl hexanoate, ethyl octanoate, methyl benzoate, anisyl propionate and ethyl salicylate; ethers such as diethyl ether and dipropyl ether; hydrocarbons such as hexane, heptane, octane and toluene; halogenated hydrocarbons such as methylene chloride, chloroform, carbon tetrachloride and trichloroethylene; ketones such as acetone, 2-butanone, 2-pentanone, 2-heptanone and 4-heptanone; lactones and lactams such as ε-caprolactone, ε-caprolactam and γ-valerolactone; and nitriles such as acetonitrile, succinonitrile, 1,4-dicyanobutane and benzonitrile. In general, the compounds which are most effective and are, therefore, preferred are alcohols, esters, hydrocarbons, halogenated hydrocarbons, nitriles, aldehydes and ketones having the structures defined below:

R-OH where

R=alkyl containing 1-8 carbon atoms, alkenyl containing 2-8 carbon atoms, aralkyl containing 7-10 carbon atoms, or aralkenyl containing 7-10 carbon atoms.

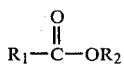

where
R$_1$=alkyl containing 1-8 carbon atoms, alkenyl containing 2-8 carbon atoms, cycloalkyl containing 5-8 carbon atoms, aralkyl containing 7-10 carbon atoms, or aralkenyl containing 7-10 carbon atoms, and
R$_2$=alkyl containing 1-8 carbon atoms, alkenyl containing 2-8 carbon atoms, cycloalkyl containing 5-10 carbon atoms, or aralkyl containing 7-10 carbon atoms.

R$_3$-CH$_2$-R$_4$ where
R$_3$=phenyl, alkyl containing 1-6 carbon atoms, or alkenyl containing 2-6 carbon atoms, and
R$_4$=H or alkyl containing 1-3 carbon atoms.

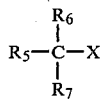

where
X=F, Cl or Br,
R$_5$=H, F or Cl,
R$_6$=H, F, Cl or Br,
R$_7$H, F, Cl, alkyl or chloroalkyl containing 1-5 carbon atoms, and
R$_5$ and R$_7$ together=chloroalkylidene containing 1-5 carbon atoms.

R$_8$-CN where
R$_8$=alkyl containing 1-8 carbon atoms, alkenyl containing 2-8 carbon atoms, or cyanoalkyl containing 1-8 carbon atoms.

R$_9$CHO where R$_9$=H, alkyl containing 1-8 carbon atoms or alkenyl containing 2-8 carbon atoms.

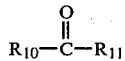

where
R$_{10}$ and R$_{11}$=alkyl containing 1-4 carbon atoms.

Although the presently disclosed invention is particularly advantageous in connection with the canning of fruits and vegetables, it is apparent that the treatment could also be applied to fruits and vegetables which are heat processed and then stored under non-sterile conditions such as refrigerated storage. In any case, the treatment is generally applied to fresh fruits and vegetables after they have been subjected to preliminary processing to obtain a form suitable for consumption. Such preliminary processing may include washing, peeling, seed removal, blanching and cutting into halves, chunks, slices or strips. In some cases no preliminary processing may be necessary so that the treatment disclosed herein can be applied directly to the harvested form of the fruit or vegetable.

Since the present invention acts primarily as a stabilizer of texture qualities, it is important that the fruit or vegetable being treated be as fresh as possible. If the treatment is applied to fruits or vegetables which have already undergone significant texture deterioration due to normal processes which occur before and after harvesting, the texture of the treated product will be correspondingly less satisfactory. The speed of the normal texture deterioration processes varies widely depending on the particular fruit or vegetable, its degree of maturity or ripeness when harvested, storage and handling conditions to which it is subjected following harvest, etc. These factors are well recognized, however, so that preservation methods such as canning are usually applied to fruits and vegetables that have reached a degree of maturity that is considered ideal as far as flavor, texture and processing are concerned. Thus, this invention is conveniently used as an additional treatment step in conjunction with the conventional processing and preservation of fruits and vegetables.

In carrying out the actual treatment process of this invention, the fruit or vegetable is first peeled, washed, blanched, sliced, etc. if such preliminary processing is required. The solid fruit or vegetable material is then contacted with the desired liquid organic compound by spraying, exposure to an atmosphere of organic compound vapors or, alternatively, by submersion in a pool of the liquid or an aqueous medium containing the organic compound. When the spraying or vapor contacting technique is used, a quantity of organic compound equivalent to at least 0.1 percent by weight and preferably at least 1 percent based on the weight of the fruit or vegetable material is uniformly distributed on the surface of the material. If the alternative technique of submersion in the organic liquid medium is used, the quantity of organic compound should be sufficient to cover the fruit or vegetable material. When the submersion procedure employs an aqueous treatment medium, such a medium should contain at least 5 percent and, preferably, at least 10 percent by weight of the organic compound based on the weight of the aqueous medium. The aqueous media may also contain up to one percent by weight suitable emulsifiers or surface-active agents. Regardless of the method used for bringing the fruit or vegetable material into contact with the organic compound, the organic compound is allowed to remain in contact with the material for a short period of time. A contact time of at least 10 minutes and, preferably, at least 20 minutes is desirable. The temperature during this treatment is maintained between approximately 0° and 75° C. and, preferably, between 15° and 40° C. At the end of the treatment period the excess liquid is drained from the material and residual organic compound is removed from the fruit or vegetable material by washing or rinsing with water or other suitable aqueous media.

The amount of rinsing required will depend on the fruit or vegetable being processed and the organic compound used in the treatment step. It is desirable to continue rinsing until substantially all of the treating compound has been removed so that the flavor of the treated vegetable or fruit will not be adversely affected by residues of the treating compound. It is often advantageous to select an organic compound for the treatment step which is also a natural constituent of the fruit or vegetable being treated. For example, 1-butanol, 1-hexanol and 2-propanol occur naturally in apples and would be desirable organic compounds for treating fresh apple slices. Similarly, ethyl acetate, ethyl propionate and ethyl butyrate are also natural constituents of apples and could be used in conjunction with the preservation of fresh apple slices by canning. The use of treating compounds which are also natural constituents of the fruit or vegetable material being processed makes total removal of residual compound from the processed material less critical.

Following treatment with the organic compound and removal thereof by rinsing, the treated solid fruit or vegetable material is heat-processed in the conventional manner. Thus, material that is to be canned is packed in water, brine or syrup and then the packed product is heated to sterilize the contents of the sealed cans.

Although the beneficial effects of the treatment with organic compounds are readily perceived by organoleptic testing, they can also be confirmed by measurements with appropriate instrumentation. It has been found that useful measurements can be made using an Instron Universal Testing Machine available from Instron Corporation of Canton, Mass. The sample to be measured is placed in a standard shear-compression cell such as the C406 model available from Instron Corporation or model CS-1 available from Food Technology Corporation of Rockville, Md. The resistance to compression exhibited by the sample is then measured by the Universal Testing Machine. Analysis of the measurement data is facilitated by interfacing the Universal Testing Machine with a suitable computer such as the Model No. 9845B computer available from Hewlett-Packard Company of Palo Alto, Calif. An alternative to the shear-compression cell technique involves compression of the sample between a flat anvil and a cooperating crush head. In either case the use of the Universal Testing Machine for sample analysis provides a more reliable basis for comparing test samples with control samples.

The examples given below will serve to illustrate further the practice of this invention and its attendant advantages. Where reference is made to control samples, it should be noted that material used as a control is derived from the same supply source as that used for the treated sample and is processed in the same way except for the treatment step with the organic compound.

EXAMPLE 1

Red Delicious apples were pared and sliced uniformly. A control sample consisting of 250 grams of the sliced apples was placed in a glass jar and was covered with 400 milliliters of syrup prepared by dissolving 1 cup of sucrose in 2 cups of water. A second 250-gram portion of the sliced apples was covered with 500 milliliters of an aqueous medium prepared from 200 grams ethyl acetate, 2 grams of Tween 80 (a polyoxyalkylene derivative of sorbitan monooleate available from ICI Americas Inc. of Wilmington, Delaware) and one liter of water and the covered apples were allowed to stand for 30 minutes at approximately 24° C. The ethyl acetate treating medium was then drained off and the apple slices were rinsed by running a stream of tap water downwardly through the sample for about one hour. The treated and washed apple slices were packed in a syrup in the same manner as the control sample and the sealed jars containing the treated and control samples were heated at 121° C. for 20 minutes. The jars containing the canned apple slices were allowed to cool and both the treated and control samples were subjected to measurement with the Instron Universal Testing Machine by placing 50 grams of the canned apple slices in a shear-compression cell and using a driven speed of 10 cm/min. and a force range of 50 kilograms full scale. The force measurement for the control sample was 9 kg. and that for the treated sample was 25 kg. These results were consistent with taste panel results wherein tasters adjudged the treated apple slices to have a texture that was superior to that of the control sample.

EXAMPLE 2

Bean sprouts, obtained by subjecting mung beans to conventional germination conditions, were treated with ethyl acetate under various conditions. Two hundred gram portions of newly harvested bean sprouts were immersed in aqueous emulsions prepared by adding 0.8 gram of Tween 80 and ethyl acetate amounts ranging from 10 to 60 grams to each 100 milliliters of water. The bean sprouts were placed in 500 milliliter portions of the ethyl acetate-containing media and were allowed to stand at 24° C. for 30 minutes. The aqueous media were then drained from the bean sprouts and the sprouts were rinsed for 30 minutes by running tap water over them. The rinsed bean sprouts were canned in a brine containing calcium lactate and citric acid and autoclaved at 15 p.s.i.g. for 20 minutes at 121° C. Measurement of the compression force for each of the samples was carried out using the procedure described in Example 1 except that 30-gram samples instead of 50-gram samples were used.

| Grams of Additive/100 ml. Water | | |
|---|---|---|
| Ethyl Acetate | Tween 80 | Force Measurement in Kg. |
| 0 | 0.8 | 86 |
| 10 | 0.8 | 140 |
| 20 | 0.8 | 138 |
| 30 | 0.8 | 143 |
| 40 | 0.8 | 135 |
| 50 | 0.8 | 136 |
| 60 | 0.8 | 137 |

The above data indicate that the beneficial effects of the ethyl acetate treatment are achieved with aqueous media containing about 10 percent concentrations of ethyl acetate and that increasing concentrations of ethyl acetate are neither significantly beneficial nor detrimental as compared with the 10 percent concentration level.

EXAMPLE 3

A variety of organic compounds were evaluated as treating agents for bean sprouts by preparing aqueous media containing 20 percent by weight of the organic compounds and 0.2 percent by weight of Tween 80. The procedure involved soaking 200-gram portions of bean sprouts in 500 milliliters of the aqueous treating medium at room temperature for 30 minutes followed by rinsing for 30 minutes with running tap water. The treated bean sprouts were canned in a brine containing calcium lactate and citric acid and heated for 20 minutes at 15 p.s.i.g. and 121° C. Texture measurements were made on 30-gram samples with the shear-compression cell in accordance with the procedure described in Example 1. The results are tabulated below and are arranged in groups due to the inherent variation in texture of fresh bean sprouts caused by storage conditions for the fresh sprouts, storage time after harvesting, etc. The control sample in each group, however, is drawn from the same batch of bean sprouts as the treated sprouts within that group.

|  | Organic Compound | Force Measurement in Kg. |
|---|---|---|
| Group 1. | None (Control) | 96 |
|  | Methanol | 121 |
|  | Ethanol | 116 |
|  | 1-Propanol | 143 |
|  | 2-Propanol | 118 |
|  | 1-Butanol | 156 |
| Group 2. | None (Control) | 67 |
|  | Acetonitrile | 97 |
|  | Methylene chloride | 130 |
|  | Toluene | 113 |
|  | Chloroform | 121 |
|  | Carbon tetrachloride | 117 |
|  | Ethyl octanoate | 73 |
| Group 3. | None (Control) | 113 |
|  | Hexyl acetate | 145 |
|  | Propylene carbonate | 138 |
|  | $\epsilon$-Caprolactone | 127 |
|  | $\epsilon$-Caprolactam | 131 |
| Group 4. | None (Control) | 69 |
|  | 1,4-Dicyanobutane | 78 |
|  | Benzonitrile | 123 |
|  | Succinonitrile | 93 |
|  | Benzamide | 82 |
|  | Succinimide | 93 |
|  | Acetamide | 83 |
|  | 1-Hexanol | 112 |
|  | Benzyl acetate | 85 |
|  | Trichloroethylene | 124 |
| Group 5. | None (Control) | 98 |
|  | 1-Bornyl acetate | 116 |
|  | Ethyl salicylate | 114 |
|  | Ethyl decanoate | 109 |
|  | Diethyl phthalate | 109 |
|  | Benzyl alcohol | 123 |
|  | Ethyl hexanoate | 122 |
|  | $\gamma$-Valerolactone | 109 |
|  | Methyl benzoate | 124 |
|  | Ethyl acetoacetate | 117 |
| Group 6. | None (Control) | 102 |
|  | Allyl acetate | 138 |
|  | Methyl methacrylate | 140 |
|  | Heptane | 118 |
|  | Hexane | 131 |
|  | Octane | 133 |

EXAMPLE 4

The procedure of Example 3 was repeated except that, instead of canning the rinsed bean sprouts in brine, the rinsed sprouts were immersed in water and heated to the temperature of boiling water for 40 minutes in a microwave oven.

| Organic Compound | Force Measurement in Kg. |
|---|---|
| None (Control) | 78 |
| Methyl acetate | 120 |
| Propyl acetate | 151 |
| Diethyl succinate | 142 |
| Methyl formate | 96 |

EXAMPLE 5

Fresh celery stalks were cleaned and cut into one inch pieces. The celery pieces were covered with an aqueous medium containing 40 percent by weight ethyl acetate and 0.4 percent by weight Tween 20 (a polyoxyalkylene derivative of sorbitan monolaurate available from ICI Americas, Inc.). The covered celery pieces were allowed to stand at 23° C. for 1 hour, the aqueous treating medium was drained off and the celery pieces were washed for 20 minutes with a tap water spray. The celery pieces (185 grams) were then placed in 500 milliliters of water and heated in a pressure cooker for 11 minutes at 15 p.s.i.g. A 30-gram sample of both treated and control celery pieces was placed in a standard shear-compression cell and measurements were made in accordance with the procedure described in Example 1. The force measurement for the control sample was found to be 71 kg. while that for the treated celery pieces was 105 kg.

EXAMPLE 6

The procedure of Example 5 was repeated except that one inch pieces of fresh green pepper were treated in the same manner as the celery pieces. The force measurement for the control sample was 22 kg. while that for the treated green pepper pieces was 28 kg.

EXAMPLE 7

A mixture of 80 parts by weight newly harvested bean sprouts and 20 parts by weight fresh celery pieces measuring about 0.5 inch was covered with an aqueous medium containing 20 percent by weight ethyl acetate and 0.2 percent by weight Tween 20. The covered mixture was allowed to stand at 23° C. for 20 minutes, was rinsed for 20 minutes with a tap water spray and canned in a glass jar in brine containing calcium lactate and citric acid. The canning procedure involved heating in an autoclave for 11 minutes at 121° C. and 15 p.s.i.g. A control sample was similarly processed except for the ethyl acetate treating step. The force measurement for the control sample was 60 kg. and that for the treated sample was 109 kg. as measured with 30-gram samples using the procedure of Example 1.

EXAMPLE 8

The flesh portion of fresh cantaloupe was cut into uniform size pieces. A 250-gram portion of the cut pieces was covered with an aqueous medium containing 20 percent by weight ethyl acetate and 0.2 percent by weight Tween 80. The cantaloupe pieces were allowed to stand in the aqueous medium at 23° C. for 30 minutes, the aqueous medium was drained off and the cantaloupe pieces were then canned in 300 milliliters of syrup prepared by dissolving 1 cup of sucrose in 2 cups of water. The canning process involved heating the syrup-covered cantaloupe at 121° C. for 20 minutes. A 250-gram control sample of cut cantaloupe pieces was canned in the same manner except for the treating step with the ethyl acetate-containing medium. The treated and control samples of canned cantaloupe pieces were evaluated by measurement with the Instron Universal Testing Machine using the procedure described in Example I except that 30-gram samples were used. The force measurement for the treated cantaloupe pieces was 13.5 kg. while that for the control sample was 6.4 kg. Taste panel results confirmed that the treated cantaloupe pieces were firmer than the control sample.

EXAMPLE 9

A 250-gram portion of newly harvested bean sprouts was placed in a conical sieve. A thermocouple was inserted through a hole in the sieve and into the mass of bean sprouts, a lid was placed in the sieve above the bean sprouts and the sieve was suspended in a container above a heated pool (200 ml.) of ethyl acetate. Vapor from the heated ethyl acetate penetrated the sieve and contacted the bean sprouts causing the temperature of the sprouts to increase to 70° C. The bean sprouts were maintained for one hour at 70° C. in the ethyl acetate vapor atmosphere, the sieve was removed from the container and the bean sprouts were rinsed for 30 minutes under running tap water. The treated and rinsed bean sprouts were then canned in 300 ml. of brine containing citric acid and calcium lactate with an untreated 250-gram control sample of bean sprouts being canned in a similar manner. Both treated and control samples were autoclaved at 15 p.s.i.g. for 20 minutes at 121° C. Evaluation by the Instron Universal Testing Machine using 30-gram samples and the procedure described in Example 1 resulted in a force measurement of 126 kg. for the treated bean sprouts and 103 kg. for the control sample. Evaluation by taste panel confirmed that the treated bean sprouts were more crisp.

EXAMPLE 10

A 250-gram portion of newly harvested bean sprouts was placed in 500 milliliters of an aqueous treating medium containing 2 percent by weight formaldehyde. The medium containing the sprouts was allowed to stand at 4° C. for 16 hours, the treating medium was drained off and the bean sprouts were rinsed for 5 minutes with running tap water. The treated and rinsed bean sprouts were immersed in water and heated to the temperature of boiling water for 18 minutes in a microwave oven. The cooled bean sprouts were subjected to measurement by an Instron Universal Testing Machine provided with a flat anvil and cooperating crush head. Six randomly selected bean sprouts each having a diameter of approximately 3 mm. were placed on the anvil surface and were compressed by the crush head programmed at a drive speed of 10 cm/min. and a force range of 100 kilograms full scale. The force measurement for the treated sample was 50 kg. and that for the control sample was 23 kg. The force measurement for unprocessed, newly harvested bean sprouts was determined in a similar manner for comparison purposes and was found to be 63 kg.

EXAMPLE 11

The procedure of Example 10 was repeated except that the aqueous treating medium contained 1 percent by weight acetaldehyde. The resulting force measurement for the treated sample was 38 kg., that for the control sample was 21 kg. and that for unprocessed, newly harvested bean sprouts was 55 kg.

EXAMPLE 12

The procedure of Example 10 was repeated except that the aqueous treating medium contained 5 percent by weight acetone. The resulting force measurement for the treated sample was 31 kg., that for the control sample was 20 kg. and that for unprocessed, newly harvested bean sprouts was 59 kg.

What is claimed is:

1. A process for treating fruit or vegetable material to minimize loss of texture which comprises contacting said material for a period of time sufficient to stabilize the texture of said material at a temperature of about 0° C. to 75° C. with at least 0.1 percent by weight based on the weight of said materials being treated of an organic compound selected from the group consisting of:
   (a) alcohols,
   (b) aldehydes,
   (c) amides,
   (d) esters,
   (e) hydrocarbons,
   (f) halogenated hydrocarbons,
   (g) ketones,
   (h) lactones and
   (i) nitriles, rinsing the fruit or vegetable material with water or a water-based medium to remove the major portion of said organic compound and heating the rinsed material at temperatures of at least 80° C. for a sufficient period of time to effect sterilization of the material.

2. The process of claim 1 wherein the organic compound is incorporated into an aqueous medium that is contacted with the fruit or vegetable material.

3. The process of claim 2 wherein the aqueous medium includes a non-ionic surface-active agent.

4. The process of claim 1 wherein the fruit or vegetable material is newly harvested bean sprouts.

5. The process of claim 1 wherein the rinsed fruit or vegetable material is heated in a container that can be sealed to maintain the sterility of the processed material.

6. The process of claim 1 wherein said organic compound is an alcohol having a chemical structure R-OH in which R may be alkyl containing 1-8 carbon atoms, alkenyl containing 2-8 carbon atoms, aralkyl containing 7-10 carbon atoms or aralkenyl containing 7-10 carbon atoms.

7. The process of claim 1 wherein said organic compound is an aldehyde having a chemical structure $R_9CHO$ in which $R_9$ may be hydrogen, alkyl containing 1-8 carbon atoms or alkenyl containing 2-8 carbon atoms.

8. The process of claim 1 wherein said organic compound is an ester having a chemical structure

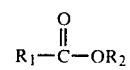

in which $R_1$ may be alkyl containing 1-8 carbon atoms, alkenyl containing 2-8 carbon atoms, cycloalkyl containing 5-8 carbon atoms, aralkyl containing 7-10 carbon atoms or aralkenyl containing 7-10 carbon atoms and $R_2$ may be alkyl containing 1-8 carbon atoms, alkenyl containing 2-8 carbon atoms, cycloalkyl containing 5-10 carbon atoms or aralkyl containing 7-10 carbon atoms.

9. The process of claim 1 wherein said organic compound is a hydrocarbon having a chemical structure $R_3$-$CH_2$-$R_4$ in which $R_3$ may be phenyl, alkyl containing 1-6 carbon atoms or alkenyl containing 2-6 carbon atoms and $R_4$ may be hydrogen or alkyl containing 1-3 carbon atoms.

10. The process of claim 1 wherein said organic compound is a halogenated hydrocarbon having a chemical structure

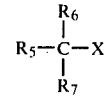

in which X may be fluorine, chlorine or bromine, $R_5$ may be hydrogen, fluorine or chlorine, $R_6$ may be hydrogen, fluorine, chlorine or bromine, $R_7$ may be hydrogen, fluorine, chlorine, alkyl containing 1-5 carbon atoms or chloroalkyl containing 1-5 carbon atoms, and $R_5$ and $R_7$ together may be chloroalkylidene containing 1-5 carbon atoms.

11. The process of claim 1 wherein said organic compound is a ketone having a chemical structure $$R_{10}-\overset{\overset{\displaystyle O}{\|}}{C}-R_{11}$$

in which $R_{10}$ and $R_{11}$ may be alkyl containing 1-4 carbon atoms.

12. The process of claim 1 wherein said organic compound is a nitrile having a chemical structure $R_8$-CN in which $R_8$ may be alkyl containing 1-8 carbon atoms, alkenyl containing 2-8 carbon atoms or cyanoalkyl containing 1-8 carbon atoms.

13. A process for treating solid fruit or vegetable material to minimize loss of texture which comprises contacting said material for at least 10 minutes at a temperature of about 0° C. to 75° C. with at least 0.1 percent by weight based on the weight of said material being treated of an organic compound selected from the group consisting of:

| (a) alcohols, | (f) halogenated hydrocarbons, |
|---|---|
| (b) aldehydes, | |
| (c) amides, | (g) ketones, |
| (d) esters, | (h) lactones and |
| (e) hydrocarbons, | (i) nitriles, | rinsing the fruit or vegetable material with water or a water-based medium to remove the major portion of said organic compound and heating the rinsed material at a temperature of at least 80° C. for a sufficient period of time to effect sterilization of the material.

14. The process of claim 13 wherein the organic compound is incorporated into an aqueous medium that is contacted with the fruit or vegetable material.

15. The process of claim 13 wherein the aqueous medium includes a non-ionic surface-active agent.

16. The process of claim 13 wherein the fruit or vegetable material is newly harvested bean sprouts.

17. The process of claim 13 wherein the rinsed fruit or vegetable material is heated in a container that can be sealed to maintain the sterility of the processed material.

18. The process of claim 13 wherein said organic compound is an alcohol having a chemical structure R-OH in which R may be alkyl containing 1-8 carbon atoms, alkenyl containing 2-8 carbon atoms, aralkyl containing 7-10 carbon atoms or aralkenyl containing 7-10 carbon atoms.

19. The process of claim 13 wherein said organic compound is an aldehyde having a chemical structure $R_9$CHO in which $R_9$ may be hydrogen, alkyl containing 1-8 carbon atoms or alkenyl containing 2-8 carbon atoms.

20. The process of claim 13 wherein said organic compound is an ester having a chemical structure $$R_1-\overset{\overset{\displaystyle O}{\|}}{C}-OR_2$$

in which $R_1$ may be alkyl containing 1-8 carbon atoms, alkenyl containing 2-8 carbon atoms, cycloalkyl containing 5-8 carbon atoms, aralkyl containing 7-10 carbon atoms or aralkenyl containing 7-10 carbon atoms and $R_2$ may be alkyl containing 1-8 carbon atoms, alkenyl containing 2-8 carbon atoms, cycloalkyl containing 5-10 carbon atoms or aralkyl containing 7-10 carbon atoms.

21. The process of claim 13 wherein said organic compound is a hydrocarbon having a chemical structure $R_3$-$CH_2$-$R_4$ in which $R_3$ may be phenyl, alkyl containing 1-6 carbon atoms or alkenyl containing 2-6 carbon atoms and $R_4$ may be hydrogen or alkyl containing 1-3 carbon atoms.

22. The process of claim 13 wherein said organic compound is a halogenated hydrocarbon having a chemical structure $$R_5-\overset{\overset{\displaystyle R_6}{|}}{\underset{\underset{\displaystyle R_7}{|}}{C}}-X$$

in which X may be fluorine, chlorine or bromine, $R_5$ may be hydrogen, fluorine or chlorine, $R_6$ may be hydrogen, fluorine, chlorine or bromine, $R_7$ may be hydrogen, fluorine, chlorine, alkyl containing 1-5 carbon atoms or chloroalkyl containing 1-5 carbon atoms, and $R_5$ and $R_7$ together may be chloroalkylidene containing 1-5 carbon atoms.

23. The process of claim 13 wherein said organic compound is a ketone having a chemical structure $$R_{10}-\overset{\overset{\displaystyle O}{\|}}{C}-R_{11}$$

in which $R_{10}$ and $R_{11}$ may be alkyl containing 1-4 carbon atoms.

24. The process of claim 13 wherein said organic compound is a nitrile having a chemical structure $R_8$-CN in which $R_8$ may be alkyl containing 1-8 carbon atoms, alkenyl containing 2-8 carbon atoms or cyanoalkyl containing 1-8 carbon atoms.

25. A preserved fruit or vegetable material having improved texture and prepared by contacting said material for a period of time sufficient to stabilize the texture of said material at a temperature between 0° C. and 75° C. with at least 0.1 percent by weight based on the weight of said material being treated of an organic compound selected from the group consisting of:

| (a) alcohols, | (f) halogenated hydrocarbons, |
|---|---|
| (b) aldehydes, | (g) ketones, |
| (c) amides, | (h) lactones and |
| (d) esters, | (i) nitriles, |
| (e) hydrocarbons, | | rinsing the fruit or vegetable material with water or a water-based medium to remove the major portion of said organic compound and heating the rinsed material at a temperature of at least 80° C. for a sufficient period of time to effect sterilization of the material.

26. The preserved fruit or vegetable material of claim 25 wherein said contacting is carried out in an aqueous medium containing said organic compound.

27. The preserved fruit or vegetable material of claim 26 wherein the aqueous medium includes a non-ionic surface-active agent.

28. The preserved fruit or vegetable material of claim 25 wherein said material is heated to a temperature of at least 95° C. in a container that can be sealed to maintain the sterility of the material.

29. The preserved fruit or vegetable material of claim 25 wherein said organic compound is an alcohol having a chemical structure R-OH in which R may be alkyl containing 1-8 carbon atoms, alkenyl containing 2-8 carbon atoms, aralkyl containing 7-10 carbon atoms or aralkenyl containing 7-10 carbon atoms.

30. The preserved fruit or vegetable material of claim 25 wherein said organic compound is an aldehyde having a chemical structure $R_9CHO$ in which $R_9$ may be hydrogen, alkyl containing 1-8 carbon atoms or alkenyl containing 2-8 carbon atoms.

31. The preserved fruit or vegetable material of claim 25 wherein said organic compound is an ester having a chemical structure.

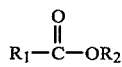

in which $R_1$ may be alkyl containing 1-8 carbon atoms, alkenyl containing 2-8 carbon atoms, cycloalkyl containing 5-8 carbon atoms, aralkyl containing 7-10 carbon atoms or aralkenyl containing 7-10 carbon atoms and $R_2$ may be alkyl containing 1-8 carbon atoms, alkenyl containing 2-8 carbon atoms, cycloalkyl containing 5-10 carbon atoms or aralkyl containing 7-10 carbon atoms.

32. The preserved fruit or vegetable material of claim 25 wherein said organic compound is a hydrocarbon having a chemical structure $R_3$-$CH_2$-$R_4$ in which $R_3$ may be phenyl, alkyl containing 1-6 carbon atoms or alkenyl containing 2-6 carbon atoms and $R_4$ may be hydrogen or alkyl containing 1-3 carbon atoms.

33. The preserved fruit or vegetable material of claim 25 wherein said organic compound is a halogenated hydrocarbon having a chemical structure

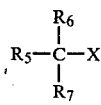

in which X may be fluorine, chlorine or bromine, $R_5$ may be hydrogen, fluorine or chlorine, $R_6$ may be hydrogen, fluorine, chlorine or bromine, $R_7$ may be hydrogen, fluorine, chlorine, alkyl containing 1-5 carbon atoms or chloroalkyl containing 1-5 carbon atoms, and $R_5$ and $R_7$ together may be chloroalkylidene containing 1-5 carbon atoms.

34. The preserved fruit or vegetable material of claim 25 wherein said organic compound is a ketone having a chemical structure

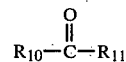

in which $R_{10}$ and $R_{11}$ may be alkyl containing 1-4 carbon atoms.

35. The preserved fruit or vegetable material of claim 25 wherein said organic compound is a nitrile having a chemical structure $R_8$-CN in which $R_8$ may be alkyl containing 1-8 carbon atoms, alkenyl containing 2-8 carbon atoms or cyanoalkyl containing 1-8 carbon atoms.

36. Canned bean sprouts having improved texture and prepared by contacting for a period of time sufficient to stabilize the texture of said material newly harvested bean sprouts with at least 0.1 percent by weight ethyl acetate based on the weight of the bean sprouts, said contacting being carried out at a temperature between 0° C. and 75° C., rinsing the ethyl acetate-treated bean sprouts with water or a water-based medium to remove the major portion of the ethyl acetate, placing the rinsed bean sprouts in a sealable can and heating the canned bean sprouts at an elevated temperature for a sufficient period of time to effect sterilization of the contents of said can.

37. The canned bean sprouts of claim 36 wherein said newly harvested bean sprouts are contacted with an aqueous medium containing at least 5 percent by weight ethyl acetate for at least 10 minutes.

38. The canned bean sprouts of claim 37 wherein said aqueous medium includes a non-ionic surface-active agent.

39. The canned bean sprouts of claim 36 wherein the canned bean sprouts have been heated at a temperature of at least 95° C. to effect sterilization.

* * * * *

UNITED STATES PATENT AND TRADEMARK OFFICE
CERTIFICATE OF CORRECTION

PATENT NO. : 4,336,273
DATED : June 22, 1982
INVENTOR(S) : Chi-Hang Lee

It is certified that error appears in the above-identified patent and that said Letters Patent are hereby corrected as shown below:

Column 2, line 2, "temperature" should be --temperatures-- line 18, "subseqent" should be --subsequent--

Column 3, line 36, "$R_7H$," should be --$R_7 = H$,--

Column 9, line 65, "materials" should be --material--

Signed and Sealed this

Fourteenth Day of September 1982

[SEAL]

Attest:

GERALD J. MOSSINGHOFF

Attesting Officer   Commissioner of Patents and Trademarks